(12) United States Patent
Toji

(10) Patent No.: US 11,719,673 B2
(45) Date of Patent: Aug. 8, 2023

(54) STRUCTURE OF FLOW CELL ASSEMBLY FOR CHROMATOGRAPHY DETECTOR

(71) Applicant: SHIMADZU CORPORATION, Kyoto (JP)

(72) Inventor: Yohei Toji, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/530,553

(22) Filed: Nov. 19, 2021

(65) Prior Publication Data

US 2022/0170894 A1 Jun. 2, 2022

(30) Foreign Application Priority Data

Nov. 27, 2020 (JP) .................................. 2020-196806

(51) Int. Cl.
| | |
|---|---|
| *G01N 30/38* | (2006.01) |
| *G01N 30/86* | (2006.01) |
| *G01N 30/74* | (2006.01) |
| G01N 30/02 | (2006.01) |

(52) U.S. Cl.
CPC ............. *G01N 30/38* (2013.01); *G01N 30/74* (2013.01); *G01N 30/8624* (2013.01); *G01N 2030/027* (2013.01)

(58) Field of Classification Search
CPC ......... G01N 2030/027; G01N 21/0303; G01N 21/05; G01N 30/38; G01N 30/74; G01N 30/8624

See application file for complete search history.

(56) References Cited

U.S. PATENT DOCUMENTS

| | | | | |
|---|---|---|---|---|
| 5,153,679 | A | * | 10/1992 | Gilby .................... G01N 21/05 356/440 |
| 6,188,813 | B1 | | 2/2001 | Dourdeville |
| 6,526,188 | B2 | | 2/2003 | Dourdeville |
| 6,542,231 | B1 | * | 4/2003 | Garrett ................... G02B 6/032 385/12 |
| 7,859,657 | B2 | | 12/2010 | Jeannotte | |
| 8,086,083 | B2 | * | 12/2011 | Mueller ............. G01N 21/0303 385/125 |

(Continued)

FOREIGN PATENT DOCUMENTS

| | | |
|---|---|---|
| JP | 3657900 B2 | 6/2005 |
| JP | 5255837 B2 | 8/2013 |
| JP | 5337186 B2 | 11/2013 |

*Primary Examiner* — Harshad R Patel
*Assistant Examiner* — Gedeon M Kidanu
(74) *Attorney, Agent, or Firm* — Renner, Otto, Boisselle & Sklar, LLP

(57) ABSTRACT

A structure of a flow cell assembly for a chromatography detector is used to generate a chromatograph of a sample, and includes a capillary extending in one direction, a housing that houses at least part of the capillary and a ferrule that holds the capillary in the housing. The capillary includes an inner tube formed of a material having a refractive index lower than that of water, and an outer tube formed of a material having strength higher than that of the material of the inner tube and has an outer diameter that is equal to or smaller than 5 mm. An outer peripheral surface of the inner tube and an inner peripheral surface of the outer tube adhere to each other, and a flow path through which a mobile phase including a sample flows is formed in the inner tube.

5 Claims, 5 Drawing Sheets

(56) References Cited

U.S. PATENT DOCUMENTS

| | | | |
|---|---|---|---|
| 8,401,346 B2 | 3/2013 | Jeannotte | |
| 9,334,989 B2* | 5/2016 | Jencks | G01N 30/6026 |
| 9,658,153 B2* | 5/2017 | Goto | G01N 30/74 |
| 10,444,205 B2* | 10/2019 | Hochgraeber | F16L 25/0018 |
| 2006/0139632 A1* | 6/2006 | Gerner | G01N 21/05 |
| | | | 356/246 |
| 2013/0341260 A1* | 12/2013 | Dehmer | B01L 3/502715 |
| | | | 277/627 |
| 2014/0055782 A1* | 2/2014 | Hatahori | G01N 21/0303 |
| | | | 356/246 |
| 2014/0063494 A1* | 3/2014 | Hatahori | G01N 21/05 |
| | | | 356/246 |
| 2014/0158599 A1* | 6/2014 | Michienzi | B01D 15/10 |
| | | | 138/148 |
| 2015/0298025 A1* | 10/2015 | Schultz | B01D 15/10 |
| | | | 250/281 |
| 2021/0208113 A1* | 7/2021 | Fukui | G01N 27/623 |

* cited by examiner

STRUCTURE OF FLOW CELL ASSEMBLY FOR CHROMATOGRAPHY DETECTOR

BACKGROUND

Technical Field

The present invention relates to the structure of a flow cell assembly for a chromatography detector and a method of manufacturing a capillary.

Description of Related Art

A liquid chromatograph has been known as a device that separates a substance included in a sample into different components. For example, in an HPLC (High-Performance Liquid Chromatography) system described in JP 3657900 B2, a solvent and a sample are supplied to a column. The sample that has passed through the column is separated into sample components and introduced into a light path of a flow cell of a detector.

Further, light is emitted from an optical fiber along the light path of the flow cell, so that the sample that flows through the light path is irradiated with light. The light that has passed through the sample is detected by a detection assembly, so that an output signal corresponding to a detection intensity is generated. A predetermined process is performed on the output signal, so that a liquid chromatogram is generated.

SUMMARY

JP 3657900 B2 describes that it is possible to improve sensitivity of a detector by increasing the length of a light path of a flow cell in accordance with Beer's law. Further, in recent years, the diameter of a light path of a flow cell is likely to be small in order to improve separation performance of a liquid chromatograph. However, with a detector described in JP 3657900 B2, it is difficult to sufficiently increase the length of a light path while reducing the diameter of a light path of a flow cell due to a problem with processability. Therefore, sensitivity of the detector cannot be improved sufficiently.

An object of the present invention is to provide a structure of a flow cell assembly for a chromatography detector and a method of manufacturing a capillary, for enabling improvement of sensitivity of a detector.

One aspect of the present invention relates to a structure of a flow cell assembly for a chromatography detector that is used to generate a chromatogram of a sample that includes a capillary extending in one direction, a housing that houses at least part of the capillary, and a ferrule that holds the capillary in the housing, wherein the capillary includes an inner tube formed of a material having a refractive index lower than a refractive index of water, and an outer tube formed of a material having strength higher than strength of a material of the inner tube and has an outer diameter that is equal to or smaller than 5 mm, and an outer peripheral surface of the inner tube and an inner peripheral surface of the outer tube adhere to each other, and a flow path through which a mobile phase including a sample flows is formed in the inner tube.

Another aspect of the present invention relates to a method of manufacturing a capillary of a flow cell assembly for a chromatography detector used to generate a chromatogram of a sample that includes preparing an inner tube that is formed of a material having a refractive index lower than a refractive index of water and extends in one direction, preparing an outer tube that is formed of a material having strength higher than strength of a material of the inner tube, extends in the one direction and is arranged to surround the inner tube, and causing an outer peripheral surface of the inner tube and an inner peripheral surface of the outer tube to adhere to each other by performing a swaging process on the outer tube, wherein a flow path through which a mobile phase including a sample flows is formed in the inner tube.

With the present invention, sensitivity of a detector can be improved.

Other features, elements, characteristics, and advantages of the present disclosure will become more apparent from the following description of preferred embodiments of the present disclosure with reference to the attached drawings.

DETAILED DESCRIPTION (1) Configuration of Chromatograph

Figure 1:
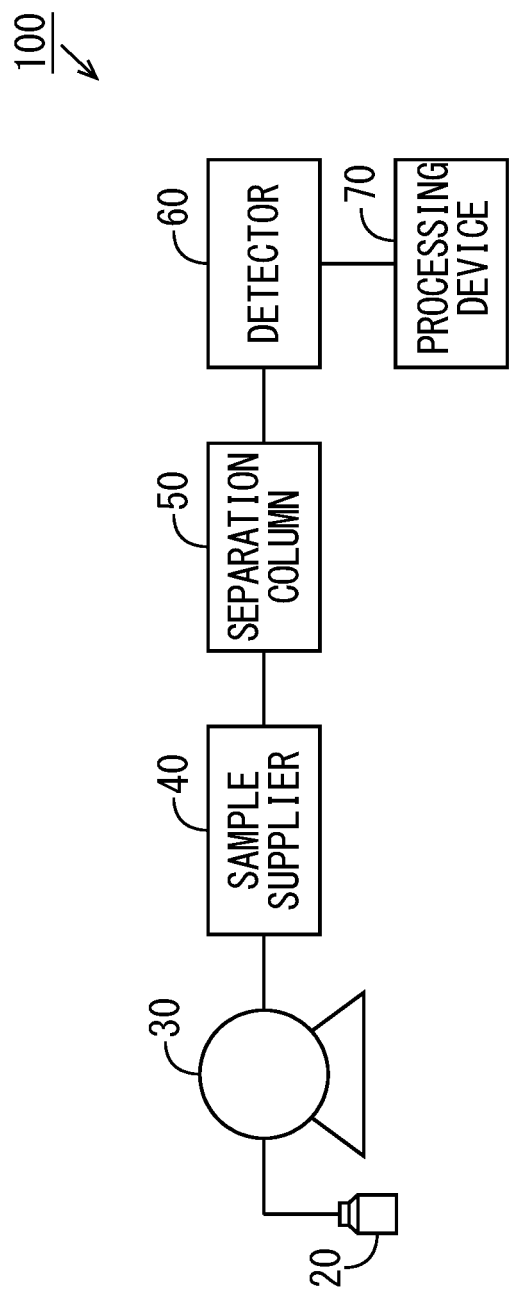
FIG. 1 is a diagram showing the configuration of a chromatograph including a flow cell assembly for a chromatography detector according to one embodiment.

The structure of a flow cell assembly for a chromatography detector and a method of manufacturing a capillary, according to embodiments of the present invention will be described below in detail with reference to the drawings. FIG. 1 is a diagram showing the configuration of a chromatograph including the structure of a flow cell assembly for a chromatography detector according to one embodiment of the present invention. In the present embodiment, the chromatograph 100 is a liquid chromatograph.

As shown in FIG. 1, the chromatograph 100 includes a mobile phase container 20, a mobile phase supplier 30, a sample supplier 40, a separation column 50, a detector 60 and a processing device 70. The mobile phase container 20 stores an aqueous solution or an organic solvent as a mobile phase. The mobile phase supplier 30 is a liquid sending pump, for example, and pumps a mobile phase stored in the mobile phase container 20.

The sample supplier 40 is an injector, for example, and introduces a sample to be analyzed into the separation column 50 together with a mobile phase supplied by the mobile phase supplier 30. The separation column 50 is housed in a column oven (not shown) and adjusted to a predetermined constant temperature. The separation column 50 separates an introduced sample into components according to differences in chemical property or composition. The detector 60 includes an absorbance detector, for example, and detects components into which a sample is separated by the separation column 50. Details of the detector 60 will be described below.

The processing device 70 includes a CPU (Central Processing Unit) and a memory, or a microcomputer or the like and controls the operation of each of the mobile phase supplier 30, the sample supplier 40, the separation column 50 (a column oven) and the detector 60. Further, the processing device 70 generates a chromatogram representing the relationship between a retention time of each component and a detection intensity, for example, based on a detection result provided by the detector 60.

Figure 2:
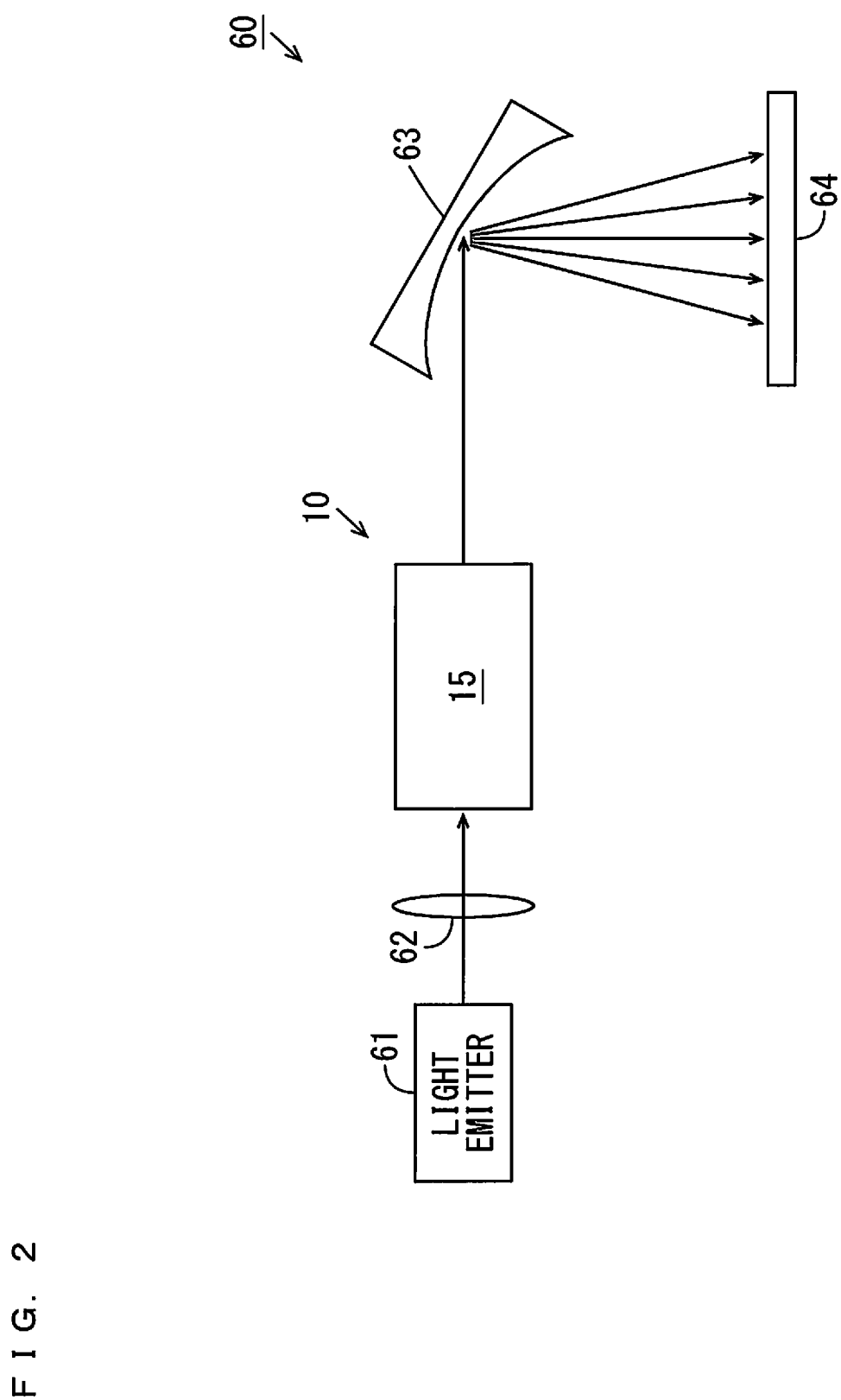
FIG. 2 is a schematic diagram showing the configuration of a detector.

FIG. 2 is a schematic diagram showing the configuration of the detector 60. As shown in FIG. 2, the detector 60 includes a flow cell assembly 10 for a chromatography detector (hereinafter abbreviated as a flow cell assembly 10), a light emitter 61, a collecting lens 62, a spectrometer 63 and a light receiver 64. The flow cell assembly 10 has a flow path 15 extending in one direction. A mobile phase including a sample that has passed through the separation column 50 of FIG. 1 is introduced into the flow path 15 of the flow cell assembly 10. Details of the flow cell assembly 10 will be described below.

The light emitter 61 is a light source that emits broadband light and includes a deuterium lamp that emits ultraviolet light in the present example. The light emitter 61 may include another light source such as a tungsten lamp or an LED (light-emitting diode) or may include a plurality of light sources that emit light having different wavelengths. The collecting lens 62 collects light emitted by the light emitter 61 and emits the light to a sample in a mobile phase flowing through the flow path 15 from one end portion of the flow cell assembly 10 with the light.

The light emitted to the sample interacts with the sample by being transmitted through the sample and then is incident on the spectrometer 63 from the other end portion of the flow cell assembly 10. The spectrometer 63 is a reflective diffraction grating, for example, and separates the light to reflect the incident light at a different angle for each wavelength. The light receiver 64 is a photo diode array in which a plurality of photo diodes are arranged one-dimensionally, for example. The light receiver 64 receives light having each wavelength into which light has been separated by the spectrometer 63 and outputs a signal indicating an amount of received light as a detection result to the processing device 70 of FIG. 1.

(2) Configuration of Flow Cell Assembly

Figure 3:
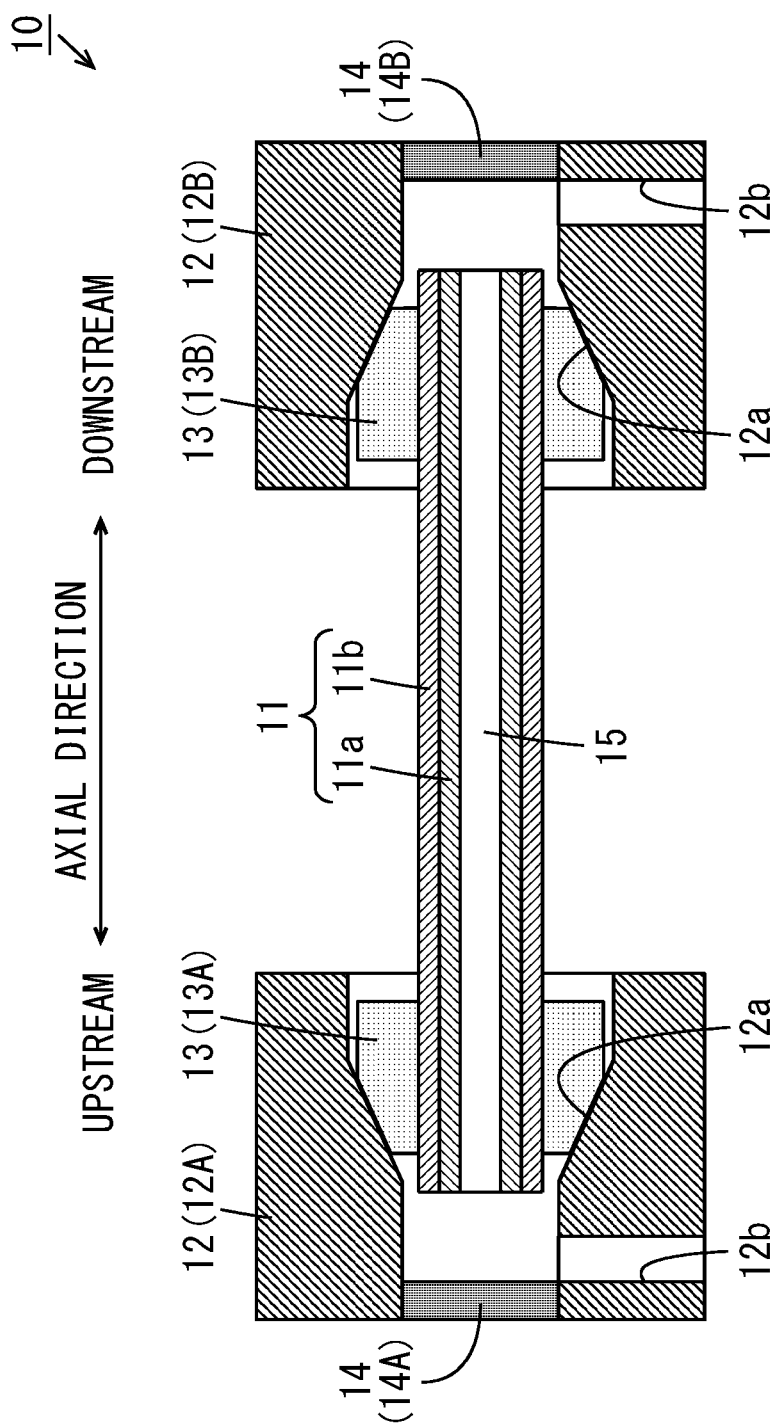
FIG. 3 is a schematic partial cross sectional view showing the structure of the flow cell assembly of FIG. 2.

FIG. 3 is a schematic partial cross sectional view showing the structure of the flow cell assembly 10 of FIG. 2. As shown in FIG. 3, the flow cell assembly 10 includes a capillary 11, a pair of housings 12, a pair of ferrules 13 and a pair of window members 14. The capillary 11 is formed to extend in one direction. The flow path 15 is formed in the capillary 11. Hereinafter, the direction in which the capillary 11 extends is referred to as an axial direction. Further, the direction in which a mobile phase flows in the axial direction is referred to as downstream, and its opposite direction is referred to as upstream. The length of the capillary 11 in the axial direction may be larger than 10 mm. For example, the length of the capillary 11 may be equal to or larger than 30 mm or may be smaller than 30 mm.

The capillary 11 includes an inner tube 11a and an outer tube 11b. In the present example, the inner tube 11a is formed of a fluororesin (teflon (registered trademark) AF, specifically) such as polytetrafluoroethylene. In this case, the refractive index of the inner tube 11a may be easily reduced to be smaller than the refractive index of water. The inner tube 11a may be formed of another material having a refractive index lower than the refractive index of water and having chemical resistance. The inner tube 11a extends in the axial direction and has a cylindrical shape or an oval cylindrical shape. The inner diameter of the inner tube 11a is equal to or smaller than 0.1 mm, for example. However, the inner diameter of the inner tube 11a may be equal to or smaller than 0.3 mm or may be larger than 0.3 mm, for example. The space in the inner tube 11a constitutes the flow path 15.

The outer tube 11b extends in the axial direction and has a cylindrical shape or an oval cylindrical shape. The outer peripheral surface of the inner tube 11a and the inner peripheral surface of the outer tube 11b adhere to each other. In the present example, the outer tube 11b is formed of stainless. In this case, deformation of the inner tube 11a can be prevented easily while the size of the outer diameter of the outer tube 11b is reduced. The outer tube 11b may be formed of another material having strength higher than that of the inner tube 11a and having chemical resistance. The outer diameter of the outer tube 11b is equal to or smaller than 5 mm.

In the following description, in a case where the pair of housings 12 is distinguished from each other, one and the other housings 12 are respectively referred to as housings 12A, 12B. Similarly, in a case where the pair of ferrules 13 is distinguished from each other, one and the other ferrules 13 are respectively referred to as ferrules 13A, 13B. In a case where the pair of window members 14 is distinguished from each other, one and the other window members 14 are respectively referred to as window members 14A, 14B.

Each housing 12 is formed of metal having chemical resistance such as stainless, for example. An opening 12a that penetrates each housing 12 in the axial direction is formed in the housing 12. One end portion and the other end portion of the capillary 11 in the axial direction are respectively inserted into the openings 12a of the housings 12A, 12B. Further, a hole 12b penetrating each housing 12 from the outer peripheral surface to the opening 12a is formed in the housing 12. The hole 12b of the housing 12A is positioned further upstream than the one end portion of the capillary 11. The hole 12b of the housing 12B is positioned farther downstream than the other end portion of the capillary 11.

Each ferrule 13 is formed of resin having chemical resistance such as ETFE (Ethylene Tetra Fluoro Ethylene). Each ferrule 13 is annular. The ferrule 13A holds the one end portion of the capillary 11 in the opening 12a of the housing 12A while surrounding the one end portion of the capillary 11. Thus, the space between the outer peripheral surface of the one end portion of the capillary 11 and the inner peripheral surface of the housing 12A is sealed. The ferrule 13B holds the other end portion of the capillary 11 in the opening 12a of the housing 12B while surrounding the other end portion of the capillary 11. Thus, the space between the outer peripheral surface of the other end portion of the capillary 11 and the inner peripheral surface of the housing 12B is sealed.

Each window member 14 is formed of a material having chemical resistance and being translucent such as quartz. The window member 14A is provided in the opening 12a of the housing 12A to close the upstream end of the opening 12a of the housing 12A. The window member 14B is provided in the opening 12a of the housing 12B to close the downstream end of the opening 12a of the housing 12B.

A mobile phase including a sample that has passed through the separation column 50 (FIG. 1) is introduced into the flow path 15 of the capillary 11 from the hole 12b of the housing 12A. A mobile phase flows through the flow path 15 in a downstream direction, is led out from the flow path 15 and is discharged to outside of the housing 12B from the hole 12b of the housing 12B.

Further, the light emitted from the light emitter 61 (FIG. 2) is incident on the flow path 15 in the capillary 11 from the window member 14A. Here, the refractive index of the inner tube 11a of the capillary 11 is lower than the refractive index of water. Therefore, in a case where water or an organic solvent having the refractive index higher than that of water is used as a mobile phase, the light incident on the flow path 15 is propagated through the flow path 15 while repeating total reflection on the inner wall surface of the inner tube 11a. The light that has been propagated through the flow path 15 interacts with a sample in a mobile phase and then is received by the light receiver 64 (FIG. 2) through the window member 14B.

(3) Method of Manufacturing Capillary

Figure 4:
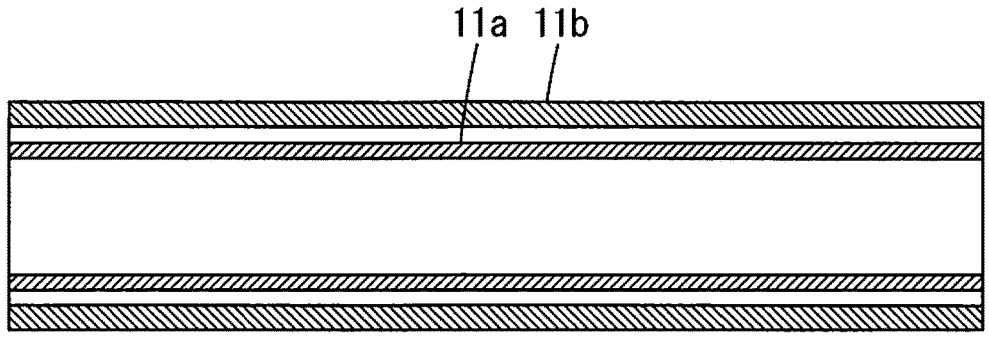
FIG. 4 is a schematic cross sectional view showing the steps of manufacturing a capillary.
Figure 5:
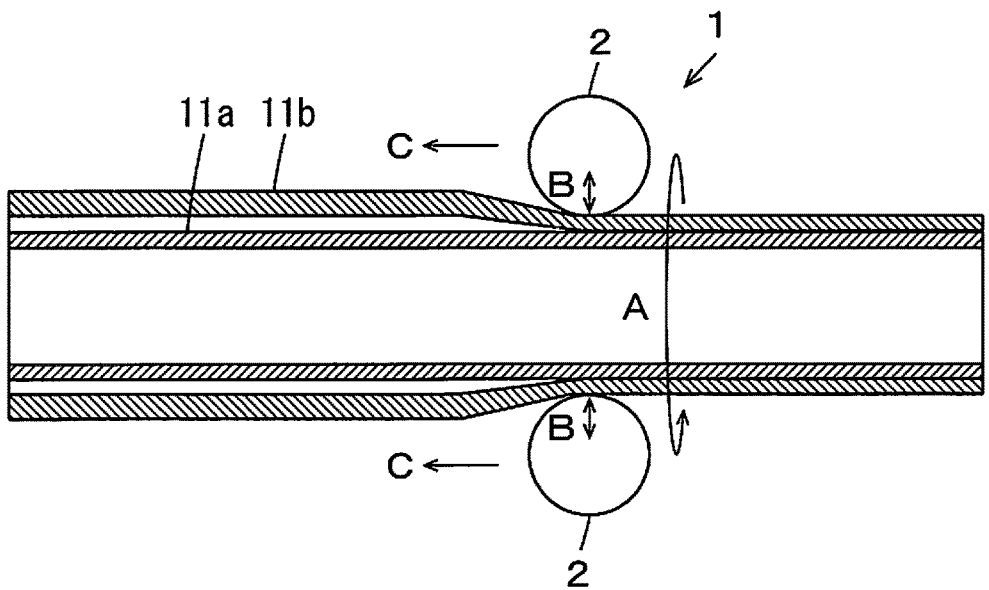
FIG. 5 is a schematic cross sectional view showing the steps of manufacturing the capillary.
Figure 6:
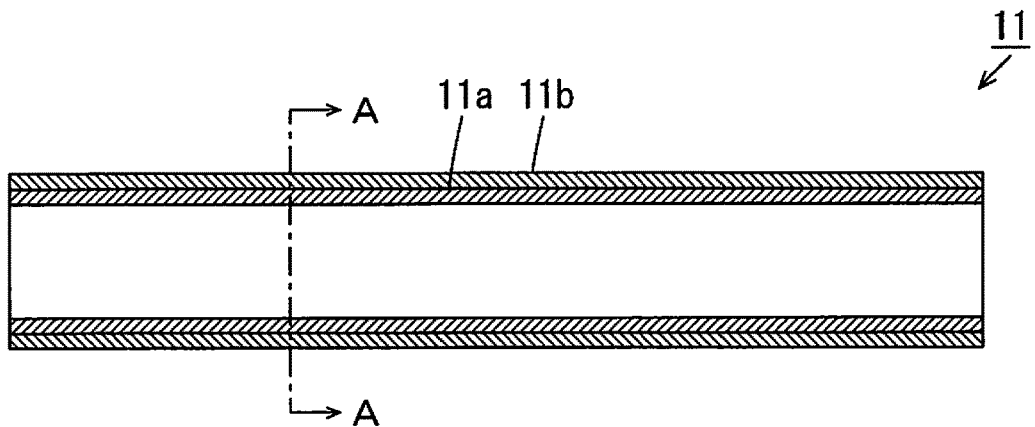
FIG. 6 is a schematic cross sectional view showing the steps of manufacturing the capillary.
Figure 7:
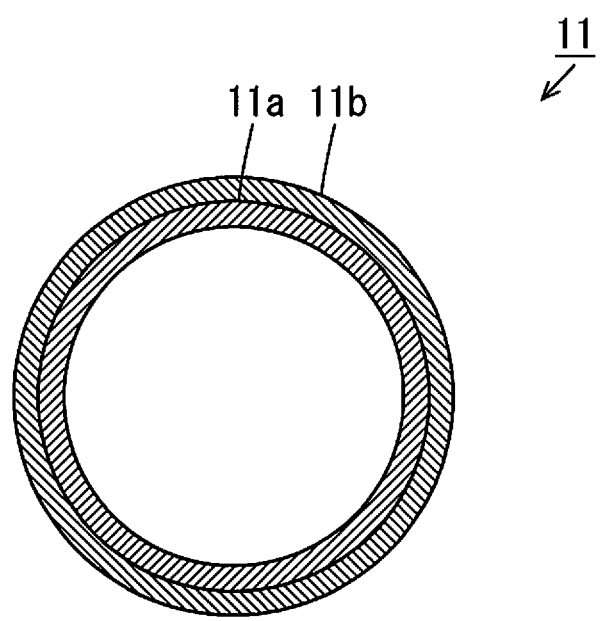
FIG. 7 is a cross sectional view taken along the line A-A of the capillary of FIG. 6.

The method of manufacturing the capillary 11 of FIG. 3 will be described. FIGS. 4, 5 and 6 are schematic cross sectional views showing the steps of manufacturing the capillary 11. FIG. 7 is a cross sectional view taken along the line A-A of the capillary 11 of FIG. 6. First, as shown in FIG. 4, the inner tube 11a and the outer tube 11b surrounding the inner tube 11a are prepared.

Next, as shown in FIG. 5, a swaging process is performed on the outer tube 11b with use of a tool 1 having a plurality of swaging dies 2. Specifically, the outer peripheral surface of the outer tube 11b is repeatedly hit by vibration of each swaging die 2 in a radial direction of the outer tube 11b as indicated by the arrows B in FIG. 5 while each swaging die 2 is rotated about the outer tube 11b as indicated by the arrow A in FIG. 5. In this state, as indicated by the arrows C in FIG. 5, the tool 1 is moved from one end to the other end of the outer tube 11b.

Thus, as shown in FIG. 6, the capillary 11 constituted by the inner tube 11a and the outer tube 11b is completed. With this manufacturing method, it is possible to cause the outer peripheral surface of the inner tube 11a and the inner peripheral surface of the outer tube 11b to adhere to each other as shown in FIG. 7 while reducing the size of the outer diameter of the outer tube 11b.

(4) Effects

In the structure of the flow cell assembly 10 according to the present embodiment, the both end portions of the capillary 11, which includes the inner tube 11a and the outer tube 11b and extends in the axial direction, are housed in the housings 12A, 12B. The both end portions of the capillary 11 are held in the housings 12A, 12B by the ferrules 13A, 13B. The inner tube 11a is formed of a material having a reflective index lower than that of water. The outer tube 11b is formed of a material having strength higher than that of the material of the inner tube 11a. The outer peripheral surface of the inner tube 11a and the inner peripheral surface of the outer tube 11b adhere to each other. The outer diameter of the outer tube 11b is equal to or smaller than 5 mm, and the flow path 15 through which a mobile phase including a sample flows is formed in the inner tube 11a.

With this configuration, the length of the capillary 11 in the axial direction can be increased easily while deformation of the inner tube 11a is prevented. Therefore, even in a case where the diameter of the flow path 15 is smaller, the length of the flow path 15 can be increased easily. Specifically, the length of the capillary 11 in the axial direction may be larger than 10 mm or may be equal to or larger than 30 mm. In this case, since the flow path 15 is long, the sensitivity of the detector 60 can be improved.

(5) Other Embodiments

While the detector 60 is an absorbance detector in the above-mentioned embodiment, the embodiment is not limited to this. The detector 60 may be another spectrophotometer.

While the housing 12 houses part of the capillary 11 in the above-mentioned embodiment, the embodiment is not limited to this. The housing 12 may house the entire capillary 11.

(6) Aspects

It is understood by those skilled in the art that the plurality of above-mentioned illustrative embodiments are specific examples of the below-mentioned aspects.

(Item 1) A structure of a flow cell assembly for a chromatography detector according to one aspect used to generate a chromatogram of a sample may include a capillary extending in one direction, a housing that houses at least part of the capillary, and a ferrule that holds the capillary in the housing, wherein the capillary may include an inner tube formed of a material having a refractive index lower than a refractive index of water, and an outer tube formed of a material having strength higher than strength of a material of the inner tube and has an outer diameter that is equal to or smaller than 5 mm, and an outer peripheral surface of the inner tube and an inner peripheral surface of the outer tube adhere to each other, and a flow path through which a mobile phase including a sample flows may be formed in the inner tube.

With this structure of a flow cell assembly for a chromatography detector, the length of the capillary in one direction can be increased easily while deformation of the inner tube is prevented. Therefore, even in a case where the diameter of the flow path is small, the length of the flow path can be increased easily. Thus, sensitivity of the chromatography detector can be improved.

(Item 2) The structure of a flow cell assembly for a chromatograph detector, according to item 1, wherein a length of the capillary in the one direction may be larger than 10 mm.

In this case, since the flow path is long, sensitivity of the chromatography detector is improved.

(Item 3) The structure of a flow cell assembly for a chromatograph detector according to item 2, wherein a length of the capillary in the one direction may be equal to or larger than 30 mm.

In this case, because the flow path is sufficiently long, sensitivity of the chromatography detector is sufficiently improved.

(Item 4) The structure of a flow cell assembly for a chromatography detector according to any one of items 1 to 3, wherein the inner tube may be formed of a fluororesin.

In this case, the reflective index of the inner tube can be reduced easily to be lower than the reflective index of water.

(Item 5) The structure of a flow cell assembly for a chromatography detector according to any one of items 1 to 4, wherein the outer tube may be formed of stainless.

In this case, deformation of the inner tube can be prevented easily while the size of the outer diameter of the outer tube is reduced.

(Item 6) A method of manufacturing a capillary according to another aspect of a flow cell assembly for a chromatography detector used to generate a chromatogram of a sample, may include preparing an inner tube that is formed of a material having a refractive index lower than a refractive index of water and extends in one direction, preparing an outer tube that is formed of a material having strength higher than strength of a material of the inner tube, extends in the one direction and is arranged to surround the inner tube, and causing an outer peripheral surface of the inner tube and an inner peripheral surface of the outer tube to adhere to each other by performing a swaging process on the outer tube, wherein a flow path through which a mobile phase including a sample flows may be formed in the inner tube.

With this method of manufacturing a capillary, the length of the capillary can be increased easily in one direction while deformation of the inner tube is prevented. Therefore, even in a case where the diameter of the flow path is small, the length of the flow path can be increased easily. Thus, sensitivity of the chromatography detector can be improved.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A structure of a flow cell assembly for a chromatography detector that is used to generate a chromatogram of a sample, comprising:
    a capillary extending in one direction;
    a housing that houses at least part of the capillary; and
    a ferrule that holds the capillary in the housing, wherein the capillary includes
        an inner tube formed of a material having a refractive index lower than a refractive index of water, and
        an outer tube formed of a material having strength higher than strength of a material of the inner tube and has a constant outer diameter that is equal to or smaller than 5 mm over an entire length of the capillary, and
        an entire outer peripheral surface of the inner tube and an entire inner peripheral surface of the outer tube adhere to each other over the entire length of the capillary, and a flow path through which a mobile phase including a sample flows is formed in the inner tube.

2. The structure of a flow cell assembly for a chromatograph detector according to claim 1, wherein
    a length of the capillary in the one direction is larger than 10 mm.

3. The structure of a flow cell assembly for a chromatograph detector according to claim 2, wherein
    a length of the capillary in the one direction is equal to or larger than 30 mm.

4. The structure of a flow cell assembly for a chromatography detector according to claim 1, wherein
    the inner tube is formed of a fluororesin.

5. The structure of a flow cell assembly for a chromatography detector according to claim 1, wherein
    the outer tube is formed of stainless.

* * * * *